United States Patent
Lyman

(10) Patent No.: US 10,097,695 B2
(45) Date of Patent: Oct. 9, 2018

(54) SYSTEM AND METHOD FOR PROVIDING CARRIER-INDEPENDENT VOIP COMMUNICATION

(75) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 813 days.

(21) Appl. No.: 12/228,301

(22) Filed: Aug. 11, 2008

(65) Prior Publication Data

US 2009/0080411 A1    Mar. 26, 2009

Related U.S. Application Data

(60) Provisional application No. 60/964,295, filed on Aug. 10, 2007.

(51) Int. Cl.
| | |
|---|---|
| *H04L 29/08* | (2006.01) |
| *H04M 7/00* | (2006.01) |
| *H04W 28/02* | (2009.01) |
| *H04L 29/06* | (2006.01) |
| *H04W 4/70* | (2018.01) |

(52) U.S. Cl.
CPC ...... *H04M 7/0057* (2013.01); *H04L 65/1069* (2013.01); *H04L 67/104* (2013.01); *H04W 28/0215* (2013.01); *H04W 4/70* (2018.02)

(58) Field of Classification Search
CPC ....... H04L 45/123; H04L 45/22; H04L 45/28; H04L 47/2416; H04W 40/12; H04W 36/18; H04M 3/2227; H04M 3/493; H04M 1/274508; H04N 21/278
See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| (Continued) | | | |

FOREIGN PATENT DOCUMENTS

| | | |
|---|---|---|
| WO | 2004049121 A2 | 6/2004 |
| WO | 2005036330 A2 | 4/2005 |
| WO | 2006020168 A2 | 2/2006 |

OTHER PUBLICATIONS

Inter-Tel, Inc. "Advanced Applications Design Guide for Contact Center Suite." Issue 1. Apr. 2006.

(Continued)

*Primary Examiner* — Salvador E Rivas
(74) *Attorney, Agent, or Firm* — Dentons US LLP

(57) ABSTRACT

Systems and methods for seamlessly providing carrier-independent VoIP calls initiated using an existing carrier-issued telephone number are provided. In exemplary embodiments, the existing carrier-issued telephone number to be called is received. Subsequently, a status regarding if the existing carrier-issued telephone number is a registered telephone number stored in a carrier-independent database is determined. If the existing carrier-issued telephone number comprises a registered telephone number in the carrier-independent database, a call is established via peer-to-peer connection using an address associated with the registered telephone number. However, if the existing carrier-issued telephone number is not a registered telephone number in the carrier-independent database, the call is placed via a standard route.

24 Claims, 8 Drawing Sheets

(56) References Cited

U.S. PATENT DOCUMENTS

| | | |
|---|---|---|
| 5,703,943 A | 12/1997 | Otto |
| 5,754,636 A | 5/1998 | Bayless et al. |
| 5,854,834 A | 12/1998 | Gottlieb et al. |
| 5,940,488 A | 8/1999 | DeGrazia et al. |
| 6,067,525 A | 5/2000 | Johnson et al. |
| 6,104,711 A | 8/2000 | Voit |
| 6,137,869 A | 10/2000 | Voit |
| 6,282,574 B1 | 8/2001 | Voit |
| 6,359,880 B1 | 3/2002 | Curry |
| 6,389,132 B1 | 5/2002 | Price |
| 6,400,719 B1 | 6/2002 | Chimura et al. |
| 6,418,214 B1 | 7/2002 | Smythe et al. |
| 6,430,275 B1 | 8/2002 | Voit |
| 6,430,289 B1 | 8/2002 | Liffick |
| 6,453,038 B1 | 9/2002 | McFarlane et al. |
| 6,628,765 B1 | 9/2003 | Bangs et al. |
| 6,718,030 B1 | 4/2004 | Turner et al. |
| 6,782,412 B2 | 8/2004 | Brophy et al. |
| 6,820,083 B1 | 11/2004 | Nagy et al. |
| 6,937,703 B1 | 8/2005 | Andreason |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,231,229 B1 | 6/2007 | Hawkins et al. |
| 7,274,781 B2 | 9/2007 | Lipton et al. |
| 7,333,976 B1 | 2/2008 | Auerbach et al. |
| 7,441,002 B1 | 10/2008 | Catchpole et al. |
| 7,477,730 B2 | 1/2009 | Starbuck et al. |
| 7,496,185 B1 | 2/2009 | Primavesi et al. |
| 7,496,189 B2 | 2/2009 | Clarrisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,606,221 B2 | 10/2009 | Artru et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 | 4/2010 | Shaffer |
| 7,711,104 B1 | 5/2010 | Flockhart |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,098,810 B2 | 1/2012 | Lyman |
| 8,131,872 B2 | 3/2012 | Kennedy et al. |
| 8,132,001 B1 | 3/2012 | Patten et al. |
| 8,214,265 B2 | 7/2012 | Peters |
| 8,223,941 B2 | 7/2012 | White et al. |
| 8,341,535 B2 | 12/2012 | Lyman |
| 8,379,832 B1 | 2/2013 | Lyman |
| 8,495,653 B2 | 7/2013 | Lyman |
| 8,499,246 B2 | 7/2013 | Lyman |
| 8,571,202 B2 | 10/2013 | Lyman |
| 8,693,659 B2 | 4/2014 | Lyman |
| 8,719,386 B2 | 5/2014 | Lyman et al. |
| 8,780,925 B2 | 7/2014 | Otto et al. |
| 8,787,548 B2 | 7/2014 | Lyman |
| 8,832,717 B2 | 9/2014 | Lyman |
| 8,976,952 B2 | 3/2015 | Lyman |
| 9,001,993 B2 | 4/2015 | Lyman |
| 9,395,873 B2 | 7/2016 | Lyman |
| 9,443,244 B2 | 9/2016 | Lyman |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0064149 A1 | 5/2002 | Elliott et al. |
| 2002/0110234 A1 | 8/2002 | Walker et al. |
| 2002/0116336 A1 | 8/2002 | Diacakis et al. |
| 2002/0120687 A1 | 8/2002 | Diacakis et al. |
| 2003/0002521 A1* | 1/2003 | Traversat ............ G06F 9/4416 370/465 |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0112941 A1 | 6/2003 | Brown et al. |
| 2003/0219029 A1 | 11/2003 | Pickett |
| 2003/0228010 A1 | 12/2003 | Clarrisse et al. |
| 2004/0001573 A1 | 1/2004 | Gusler et al. |
| 2004/0039889 A1 | 2/2004 | Elder et al. |
| 2004/0042444 A1* | 3/2004 | Edmon ............... H04M 7/0057 370/352 |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179515 A1* | 9/2004 | Kamani ............... H04L 12/5692 370/352 |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gulser et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0111440 A1 | 5/2005 | Artru et al. |
| 2005/0117586 A1* | 6/2005 | Ikeda ............... H04L 47/20 370/395.21 |
| 2005/0135593 A1 | 6/2005 | Becerra et al. |
| 2005/0152347 A1* | 7/2005 | Chen ............... H04L 12/66 370/356 |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0100923 A1 | 5/2006 | Courchesne |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0140452 A1 | 6/2006 | Raynor et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1* | 11/2006 | Otto ............... H04W 8/26 370/389 |
| 2006/0256942 A1 | 11/2006 | Gatzke et al. |
| 2006/0288099 A1 | 12/2006 | Jefferson et al. |
| 2007/0011337 A1* | 1/2007 | Brown ............... G06Q 30/02 709/227 |
| 2007/0041527 A1 | 2/2007 | Tuchman et al. |
| 2007/0061197 A1 | 3/2007 | Ramer et al. |

(56) References Cited

U.S. PATENT DOCUMENTS

| | | |
|---|---|---|
| 2007/0064913 A1 | 3/2007 | Shaffer et al. |
| 2007/0078708 A1 | 4/2007 | Yu et al. |
| 2007/0121896 A1 | 5/2007 | Patakula et al. |
| 2007/0153747 A1* | 7/2007 | Pan et al. ............... 370/338 |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1* | 1/2008 | Zampiello ......... H04L 29/12066 370/395.3 |
| 2008/0031228 A1 | 2/2008 | Gallant |
| 2008/0095355 A1 | 4/2008 | Mahalaha et al. |
| 2008/0101567 A1* | 5/2008 | Baudino ........... H04M 3/42348 379/114.01 |
| 2008/0103907 A1 | 5/2008 | Maislos et al. |
| 2008/0126216 A1 | 5/2008 | Flensted-Jensen et al. |
| 2008/0130856 A1* | 6/2008 | Ku ..................... H04M 7/0057 379/201.01 |
| 2008/0147831 A1 | 6/2008 | Redjaian et al. |
| 2008/0162701 A1 | 7/2008 | Ryabchun |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1* | 1/2009 | Rosenberg .......... H04M 7/0057 370/389 |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1* | 5/2009 | Walker ................. H04W 36/30 370/329 |
| 2009/0141884 A1 | 6/2009 | Lyman |
| 2009/0170519 A1 | 7/2009 | Wilhoite et al. |
| 2009/0275314 A1 | 11/2009 | Cotevino et al. |
| 2010/0174807 A1 | 7/2010 | Lyman |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2011/0306298 A1 | 12/2011 | Lyman |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins et al. |
| 2013/0268866 A1 | 10/2013 | Lyman |
| 2013/0268948 A1 | 10/2013 | Lyman |
| 2014/0029745 A1 | 1/2014 | Lyman |
| 2016/0277567 A1 | 9/2016 | Lyman |

OTHER PUBLICATIONS

"Enhanced Enterprise Communication: Transforming the bank into a proactive relationship center."

"Network Intelligence for Presence Enhanced Communication."

"Presence Aggregation in Endpoints."

Hull et al., Enabling Context-Aware and Privacy-Conscious User Data Sharing, 2004, Proceedings of the 2004 IEEE International Conference on Mobile Data Management.

Broder, et al., Search Advertising Using Web Relevance Feedback, 2008, pp. 1013-1022, Conference on Information and Knowledge Management, Proceeding of the 17th AC conference on Information and Knowledge Management.

"What is Xact View?" Xact View User Guide, Schmooze Communications LLC 2008. www.schmooze.com.

Final Office Action, dated Jul. 23, 2013, U.S. Appl. No. 11/827,314, filed Jul. 11, 2007.

Final Office Action, dated Jan. 26, 2012, U.S. Appl. No. 11/506,279, filed Aug. 17, 2006.

Non-Final Office Action, dated Mar. 13, 2013, U.S. Appl. No. 11/506,279, filed Aug. 17, 2006.

Non-Final Office Action, dated May 22, 2012, U.S. Appl. No. 11/800,302, filed May 3, 2007.

Notice of Allowance, dated Dec. 10, 2012, U.S. Appl. No. 11/800,302, filed May 3, 2007.

Final Office Action, dated Jul. 19, 2012, U.S. Appl. No. 11/827,314, filed Jul. 11, 2007.

Non-Final Office Action, dated Jan. 29, 2013, U.S. Appl. No. 11/827,314, filed Jul. 11, 2007.

Notice of Allowance, dated Jun. 13, 2012, U.S. Appl. No. 12/075,411, filed Mar. 10, 2008.

Non-Final Office Action, dated Apr. 19, 2012, U.S. Appl. No. 12/075,402, filed Mar. 10, 2008.

Notice of Allowance, dated Mar. 8, 2013, U.S. Appl. No. 12/075,402, filed Mar. 10, 2008.

Advisory Action, dated Feb. 15, 2012, U.S. Appl. No. 12/075,401, filed Mar. 10, 2008.

Non-Final Office Action, dated Jun. 20, 2012, U.S. Appl. No. 12/075,401, filed Mar. 10, 2008.

Notice of Allowance, dated Mar. 4, 2013, U.S. Appl. No. 12/075,401, filed Mar. 10, 2008.

Non-Final Office Action, dated May 21, 2013, U.S. Appl. No. 12/319,693, filed Jan. 8, 2009.

Non-Final Office Action, dated Feb. 1, 2012, U.S. Appl. No. 12/405,204, filed Mar. 16, 2009.

Non-Final Office Action, dated Dec. 6, 2012, U.S. Appl. No. 12/405,204, filed Mar. 16, 2009.

Non-Final Office Action, dated May 24, 2013, U.S. Appl. No. 13/213,020, filed Aug. 18, 2011.

Non-Final, dated May 7, 2013, U.S. Appl. No. 13/738,841, filed Jan. 10, 2013.

"System." Microsoft Computer Dictionary, Third Edition, 1997 p. 456-457.

* cited by examiner

SYSTEM AND METHOD FOR PROVIDING CARRIER-INDEPENDENT VOIP COMMUNICATION

CROSS-REFERENCE TO RELATED APPLICATION

The present application claims priority benefit of U.S. Provisional Patent Application No. 60/964,295 filed Aug. 10, 2007, and entitled "System and Method for Providing VoIP Over trixNet," which is hereby incorporated by reference. The present application is also related to U.S. patent application Ser. No. 11/506,279, filed Aug. 17, 2006 and entitled "Mobile Use of a PBX System," U.S. patent application Ser. No. 11/827,314, filed Jul. 11, 2007 and entitled "System and Method for Centralized Presence Management of Local and Remote Users," both of which are also incorporated by reference.

BACKGROUND OF THE INVENTION

1. Field of the Invention

Embodiments of the present invention relate generally to communication systems and more particularly to providing carrier-independent VoIP communication.

2. Description of Related Art

Conventionally, peer-to-peer calling services exist (e.g., Skype and voice chat services). However, these services require a caller to select, prior to a call, to place the call over the peer-to-peer calling service. As such the caller must proactively instruct the system to place the call via a designated calling service.

A further disadvantage is that the caller must have knowledge that the call recipient also participates in the same calling service in order to use the calling service. Often times, the caller will not know whether this is the case. Additionally, if the call recipient is not using the same calling service, the peer-to-peer call service may not be available. If the caller decides to use a PSTN connection to place a call, or if their Internet connection is not of sufficient quality to place the call using peer-to-peer, the user must use a different device (e.g., standard telephone, other softphone software, etc.) to place the call. Another disadvantage is that both parties must use phone numbers (or addresses) issued by their peer-to-peer carrier, and are not able to use standard phone numbers to reach each other over the free calling service

SUMMARY OF THE INVENTION

Embodiments of the present invention comprise systems and methods for providing carrier-independent VoIP calls using existing carrier-issued phone numbers for both calling and receiving parties. This is a significant advancement over previous systems as it requires no change in user behavior. The user still picks up the same phone and dials the same telephone number, only now it uses VoIP and is a free call.

In exemplary embodiments, an existing carrier-issued telephone number to be called is received. Subsequently, a status regarding whether the existing carrier-issued telephone number is a registered telephone number in a carrier-independent database is determined. In exemplary embodiments, the existing carrier-issued telephone number may be used as a lookup key in the carrier-independent database. If the existing carrier-issued telephone number is registered, then a corresponding address for the registered telephone number may be determined from the carrier-independent database. The address may be dynamic or static. In exemplary embodiments, the address may comprise, for example, hostname, IP address, SIP address, MAC address, or any other addressing scheme which may be associated with a communication device.

If the existing carrier-issued telephone number comprises a registered telephone number in the carrier-independent database, a call may be established via a peer-to-peer connection using the address associated with the registered telephone number over a carrier-independent network. However, if the existing carrier-issued telephone number is not a registered telephone number in the carrier-independent database, the call is placed via a standard route. The standard route may comprise, for example, a third-party VoIP service which may not be free. In other embodiments, the standard route may comprise a communication over the PSTN 108.

DETAILED DESCRIPTION OF EXEMPLARY EMBODIMENTS

Embodiments of the present invention comprise systems and methods for providing seamless and automated selection of a carrier-independent VoIP communications call route between users using standard carrier-issued phone numbers, when available, and automated fallback to a standard route when not available. At a high level, the present invention provides a toll or network bypass technology for conducting communications over an Internet Protocol (IP) network. At a more specific level, the present invention provides a service that uses a familiar address space or communication identifier of "telephone numbers" to connect any two network or communication devices or "callers" via IP, thus bypassing natural toll charges that may occur to one or both parties if the call were to traverse traditional carrier network(s). Embodiments may be practiced with no interaction required by the caller or user. For simplicity, the carrier-independent communication service provided by exemplary embodiments of the present invention may be referred to herein as trixNet service. In exemplary embodiments, the existing telephone numbers of any carrier is resolved to a hostname or address (e.g., IP address, SIP address, MAC address, or any other addressing scheme) so that users of a calling PBX may dial other users of a receiving PBX using standard carrier-issued telephone numbers (e.g., ANI numbers), yet actually connect to each other's PBX for free over IP. While exemplary embodiments are discussed in reference to telephone numbers, those skilled in the art will appreciate that other communication identifiers may be used. Advantageously, users do not need to switch carriers, as embodiments of the present invention are carrier-independent. As such, the telephone number can be issued and "owned" by any carrier or provider, but used by embodiments of the present invention. Users also do not need to know each other or even be aware that other users are participating in usage of the trixNet service as exemplary embodiments use the normal behavior patterns of dialing standard carrier-issued phone numbers. As a result, the telephone number of the caller and recipient may both be owned by different carriers, but the call remains 100% free.

Figure 1:
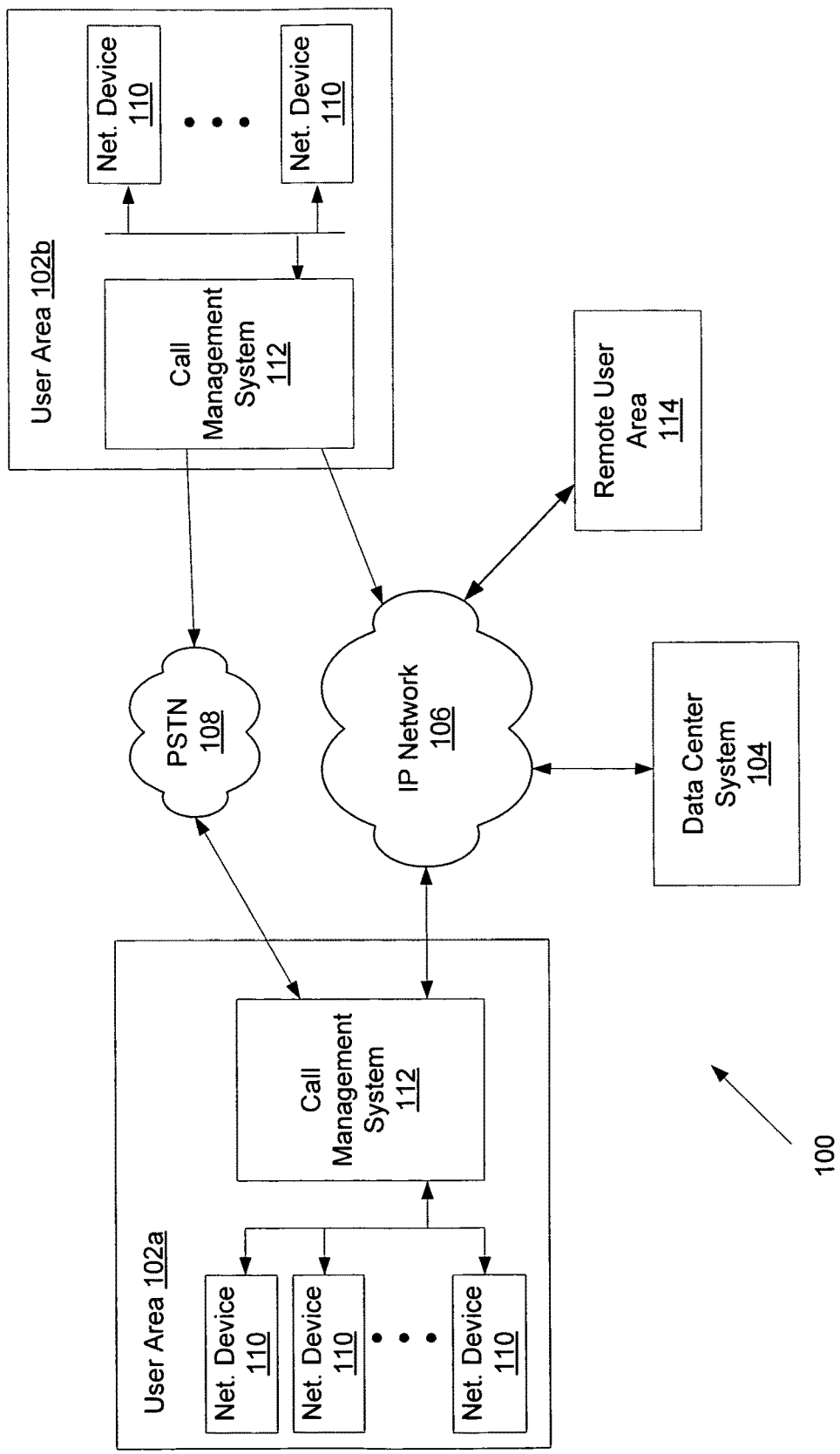
FIG. 1 is a diagram of an exemplary environment in which embodiments of the present invention may be practiced.

FIG. 1 shows an exemplary environment 100 in which embodiments of the present invention may be practiced. The exemplary environment 100 comprises user areas 102a and 102b and a data center system 104 coupled via an IP network 106. In one embodiment, the user area 102a may initiate a call to the user area 102b. In other words, user area 102a may comprise one registered user of the trixNet service and user area 102b may comprise another registered user of the trixNet service. The IP network 106 may comprise the Internet or any other wide area network configured to provide communications via IP. In contrast, a public switch telephone network (PSTN) 108 allows calls to be made using POTS.

The data center system 104 is configured to provide enhanced calling service including providing carrier-independent VoIP service to users seamlessly. In exemplary embodiments, the user area 102 may communicate with the data center system 104 via a VPN connection. This allows for communication without the need to open any firewall ports at the user area 102. The data center system 104 will be discussed in more detail in connection with FIG. 2 below.

The user area 102 may comprise, for example, an office area, home area, or any other area comprising one or more network devices 110 coupled to the IP network 106 and PSTN 108 via a call management system 112. Each network device 110 may be associated with an individual user. The network devices 110 comprise communication devices which are configured to place a call (e.g., an IP phones, computer, or softphones) including analog devices (e.g., analog phones or fax machines). The network devices 110 are also configured to receive a call via a receiving PBX. Furthermore, calls may also be received by mobile phone devices (if those calls are being forwarded or "handed-off" to a mobile device or registered to a carrier or provider that practices embodiments of the present invention).

The call management system 112 is configured to route calls either through the IP network 106 or the PSTN 108. In exemplary embodiments, the call management system 112 functions as, or comprises, a PBX and a router. The PBX allows the network device 110 to make calls via the PSTN 108. In some embodiments, the PBX may be an iPBX server capable of serving VOIP communications. The router allows the network device 110 to make VoIP calls via the IP network 106 (in lieu of an iPBX). The call management system 112 will be discussed in more detail in connection with FIG. 3.

In some embodiments, the IP network 106 may couple the user area 102a to one or more remote user areas 114. The remote user area 114 may be a location associated with an individual that remotely accesses the user area 102a. For example, the remote user area 114 may be a home office of an employee associated with the user area 102a. The remote user area 114 may also comprise one or more network devices 110 (e.g., a computer). Any number of remote user areas 114 may be coupled to the user area 102a. Additionally, it should be noted that "remote" as used herein refers to any environment external to an enterprise central location (i.e., user area 102a).

According to exemplary embodiments, the users within any of the areas (e.g., user areas 102 and remote user area 114) may exchange calls. Ideally, the users want the phone call to be directed through a free VoIP service when available in order to save on phone charges. This VoIP call may be placed using the IP network 106. Alternatively, when VoIP is not available, the call may be placed via the PSTN 108. It should be noted that calls may also be accepted by an auto-attendant (e.g., interactive voice recognition—IVR) of the receiving PBX, or even initiated by an auto-attendant of the calling PBX and bypass the need for a user (i.e., human) on either or both ends of the call.

In exemplary embodiments, trixNet service is network ubiquitous. That is, neither the calling nor receiving party needs to be geographically close to either the calling or receiving PBX. Users of either PBX can be telecommuters, fixed home workers, or mobile users so long as both parties are registered devices/users with their respective PBXs. The sending and receiving network devices 110 may simply be participating in the trixNet service. It should be noted that in some embodiments, the term PBX may be used interchangeably with the call management system 112.

The trixNet service may take many forms. In one embodiment, trixNet service may be implemented as a remote network service, which elegantly folds into a hybrid-hosted architecture. trixNet may also be implemented in a peer-to-peer fashion whereby a "directory" (e.g., relational database of IP addresses) is stored on each node or on super nodes (e.g., on the call management system 112) such that resolving of phone numbers to network locations is decentralized. An exemplary discussion of a hybrid-hosted architecture can be found in U.S. patent application Ser. No. 11/506,279 entitled "Mobile Use of a PBX System," which is incorporated by reference. It should be noted that trixNet service does not necessarily have to be implemented on a PBX. trixNet may be used, in one embodiment, at a consumer level to connect any two network devices 110 (e.g., a computer) for a one-to-one calling relationship instead of between two PBXs for a many users-to-many-users calling relationship.

Figure 2:
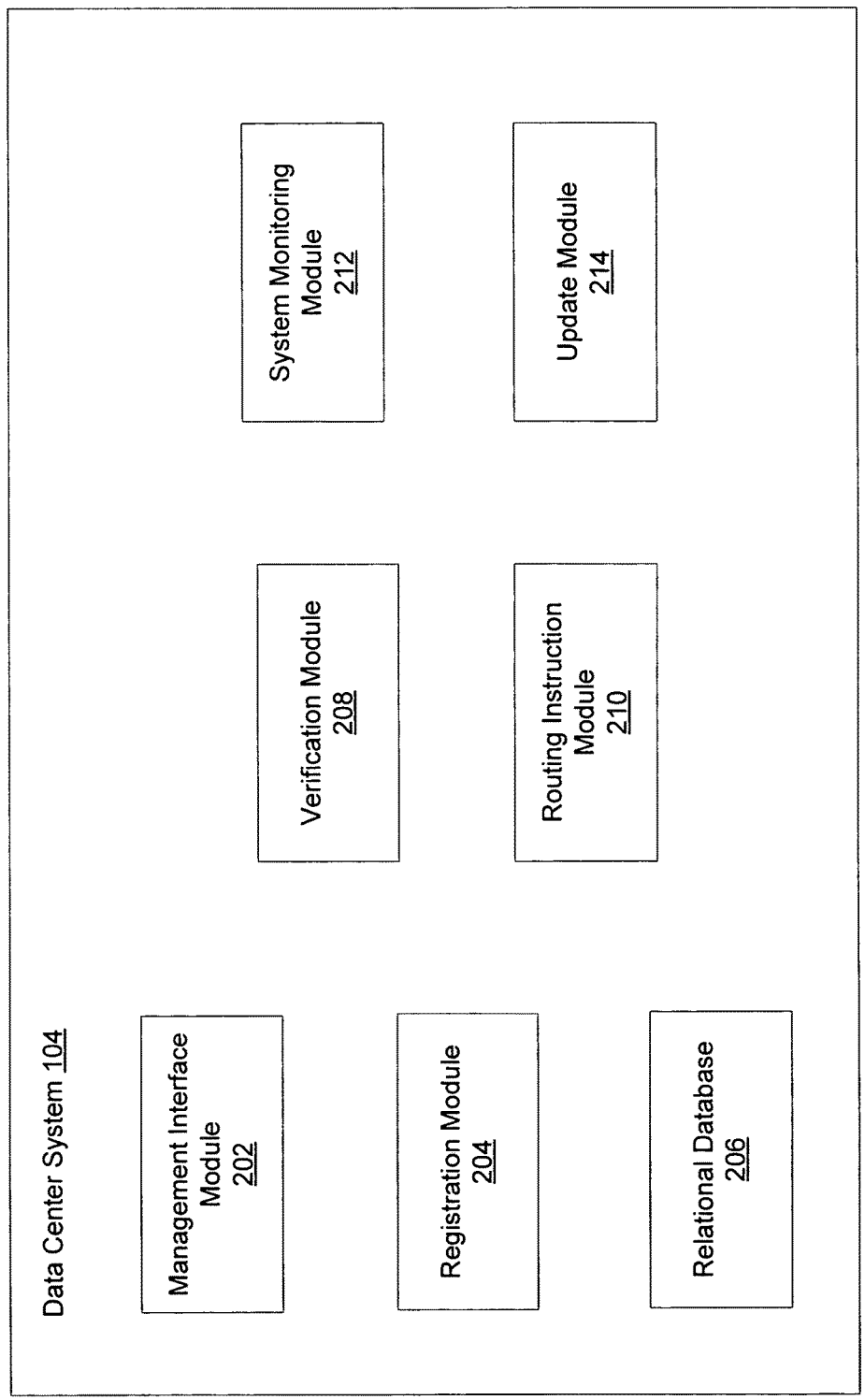
FIG. 2 is a diagram of an exemplary data center system according to one embodiment of the present invention.

Referring now to FIG. 2, the data center system 104 is shown in more detail. The data center system 104 is configured to provide enhanced calling service including providing carrier-independent VoIP communications to users seamlessly. In exemplary embodiments, the data center system 104 comprises a management interface module 202, registration module 204, relational database 206, verification module 208, routing instruction module 210, system monitoring module 212, and update module 214. It should be noted that the data center system 104 may comprise one or more servers.

The exemplary management interface module 202 is configured to provide a user interface for management of the trixNet service. When a trixNet user opts to enroll a telephone number into the trixNet service, the user may enter a telephone number in this user interface. By providing the user interface over the IP network 106 (e.g., Internet), an administrator or user may manage any telephone number from any location in the world.

The registration module 204 is configured to receive and process registration information for the trixNet service. In exemplary embodiments, the registration information may comprise at least an existing, standard carrier-issued phone number and an address (e.g., IP address, hostname, SIP address, MAC address, etc.) associated with the telephone number. The telephone number and the address may be stored in a relational database 206, which maps the telephone number and the address.

In one embodiment, trixNet service comprises a verification process performed by the verification module 208. This verification process prevents people from stealing other people's telephone numbers and unethically diverting all "in-network" trixNet phone traffic to their PBX. In this embodiment, the verification module 208 will trigger a call to the carrier-issued telephone number being registered to verify ownership. The user may then be asked to press a certain key or series of keys (i.e., DTFM sequence) to verify that they want to add the carrier-issued telephone number into the trixNet service. Once a user has validated a telephone number by pressing the correct key(s), the carrier-issued telephone number is considered authorized and a formal part of the trixNet service to be reached, for free, by any other trixNet user dialing that carrier-issued telephone number. It should be noted that a carrier-issued telephone number may be re-verified at any time, which may gracefully handle carriers who use local number portability (LNP) to move telephone numbers to different users or carriers.

The routing instruction module 210 is configured to determine a correct address associated with the carrier-issued telephone number. In exemplary embodiments, the routing instruction module 210 will receive the carrier-issued telephone number entered by the user via their network device 110 and sent via the call management system 112. The routing instruction module 210 then accesses the relational database 206 and uses the carrier-issued telephone number as a lookup key to determine if a corresponding address is mapped to the telephone number. The address may then be sent back to the call management system 112 in order to initiate the call via VoIP.

The system monitoring module 212 is configured to test a peer-to-peer connection between two addresses. In some embodiments, when a request for a peer-to-peer connection is made, the system monitoring module 212 may check the connection to ensure quality and/or availability of the connection. The results of the test may be provided to the call management system 112. It should be noted that in some embodiments, the call management system 112 may perform the testing of the peer-to-peer connection, as will be discussed further below.

The exemplary update module 214 is configured to provide updates to the call management system 112. In one embodiment, the update module 214 may provide software updates. In a decentralized embodiment, the update module 214 may provide updated relational database information to the nodes storing local versions of the relational database 206. These nodes may comprise other modules of the data center system 104. In one embodiment, the call management system 112 may comprise a node that maintains a local copy of the relational database, as will be discussed further below.

Figure 3:
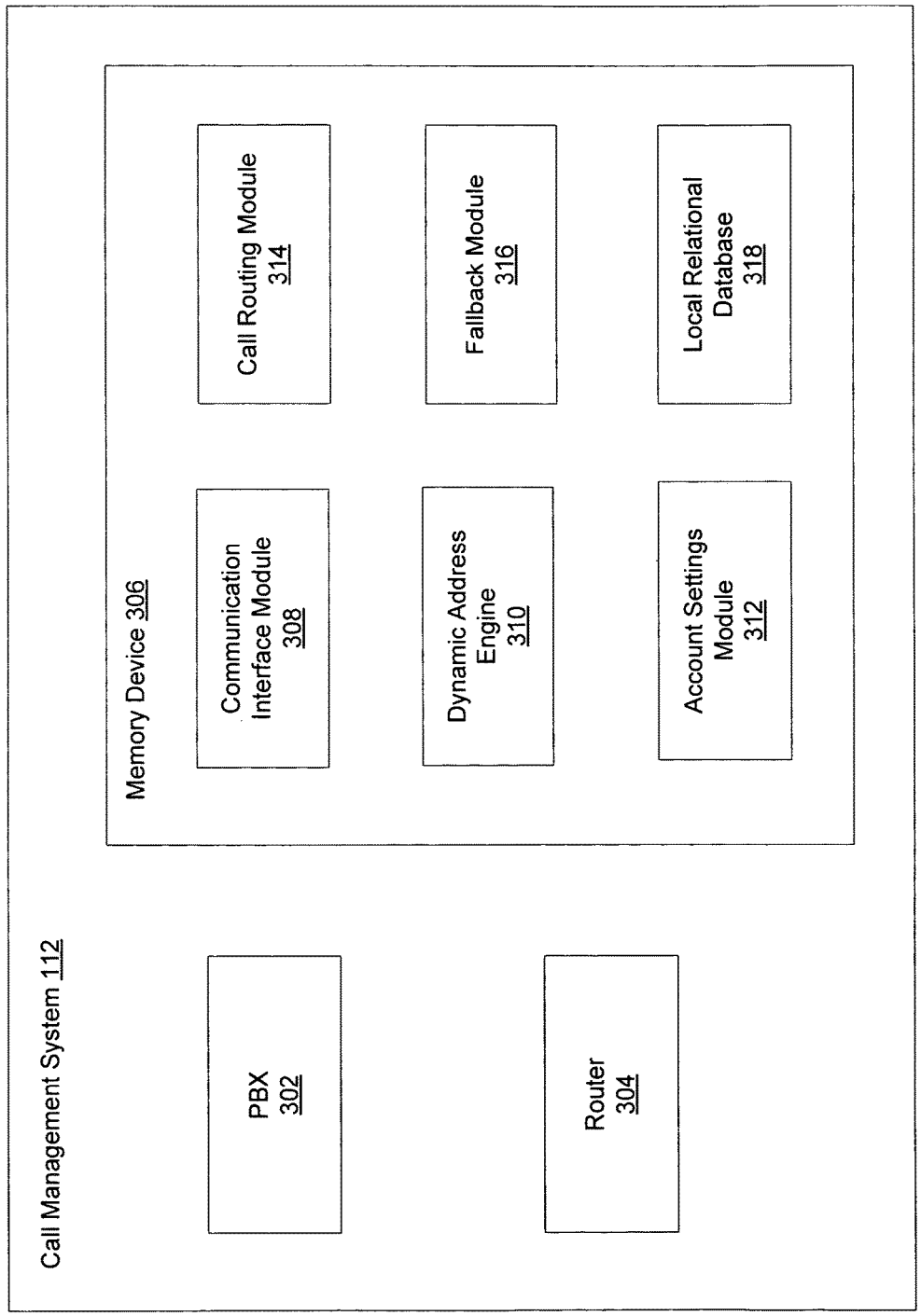
FIG. 3 is a diagram of an exemplary call management system according to one embodiment of the present invention

Referring now to FIG. 3, the exemplary call management system 112 is shown in more detail. In exemplary embodiments, the call management system 112 comprises a PBX 302 and router 304. The PBX 302 is configured to provide communications via the PSTN 108, while the router 304 is configured to provide communications (e.g., VoIP) via the IP network 106. In some embodiments, the PBX may comprise an iPBX, which eliminates the need for the router 304. The call management system 112 may further include one or more memory devices 306. The memory device 306 comprises a communication interface module 308, dynamic address engine 310, settings module 312, call routing module 314, fallback module 316, and local relational database 318.

The communication interface module 308 is configured to provide a user interface for configuring and managing functions of the call management system 112. For example, an administrator is able to create VoIP accounts and establish dial plans via the interface provided by the communication interface 306 of the call management system 112.

In exemplary embodiments, the dynamic address engine 310 is configured to handle private addresses. The dynamic address engine 310 may operate to determine and maintain a list of private (internal) addresses associated with each network device 110 coupled to the call management system 112. The dynamic address engine 310 may comprise, at least, an address check module and local lookup module as discussed in U.S. patent application Ser. No. 11/506,279 entitled "Mobile Use of a PBX System," which is incorporated by reference.

As such, embodiments of the present invention allow either the calling call management system 112 or the receiving call management system 112 (PBX or router) to use dynamic (constantly-changing) addresses. This is a by-product of the hybrid-hosted architecture which continually tracks the address of both the calling and receiving PBX. Addresses may change dynamically during a call and embodiments of the present invention will be able to keep the call active and prevent it from terminating. An example of the hybrid-hosted architecture may be found in U.S. patent application Ser. No. 11/827,314, filed Jul. 11, 2007 and entitled "System and Method for Centralized Presence Management of Local and Remote Users," which is incorporated by reference.

The settings module 312 is configured to receive (via the interface provided by the communication interface module 308) and maintain settings for the call management system 112. For example, VoIP accounts may be established and maintained via the settings module 312. Furthermore, dial plans for various calling options may be managed using the settings module 312.

The exemplary call routing module 314 is configured to route the requested call through the proper network (i.e., IP network 106 or PSTN 108) to a proper telephone number or address. In some embodiments, the call routing module 314 may send a telephone number to the data center system 104 in order to determine if an address linked to that phone number is available for routing purposes. The call routing module 314 may then receive a response from the routing instruction module 210 of the data center system 104 comprising an associated address (e.g., hostname, IP address, SIP Address, MAC address, etc.), if available. The call routing module 314 may then instruct the PBX 302 or the router 304 to initiate the communication using the telephone number (for PSTN calls) or the address (for VoIP calls).

The exemplary fallback module 316 is configured to monitor call quality and handle an auto-fallback process. The auto-fallback process, may occur when the call management system 112 cannot reach a receiving call management system 112 (PBX or router) via the IP network 106. Furthermore, auto-fallback may occur when for example, the fallback module 316 determines that quality of the free trixNet call is, or will be, poor (e.g., by using any qualitative means of measurement such as round-trip ping time, jitter, sine-wave audio echo analysis, live MOS scoring). As such, the free trixNet call is able to automatically "fall back" to a normal trunking that the calling call management system 112 uses (e.g., VoIP, analog, or TDM). This "fall-back" occurs in milliseconds or seconds and may be transparent to the user. Advantageously, the user does not have to specify that they want to make a free call. The call management system 112 tries for the free call, then goes paid if it cannot or determines it does not want to (e.g., quality is poor) go free.

The optional local relational database 318 stores telephone numbers of trixNet members in a relational database. In some embodiments, these telephone numbers may be mapped to a dynamic address associated with the dynamic address engine 310. If dynamic addresses are used (e.g., those used by cable modem or DSL services), the address associated with that telephone number is automatically updated. In other embodiments, the local relationship database 318 may comprise a copy of the relational database of the data center system 104, thus enabling peer-to-peer communications without access to the data center system 104.

Figure 4:
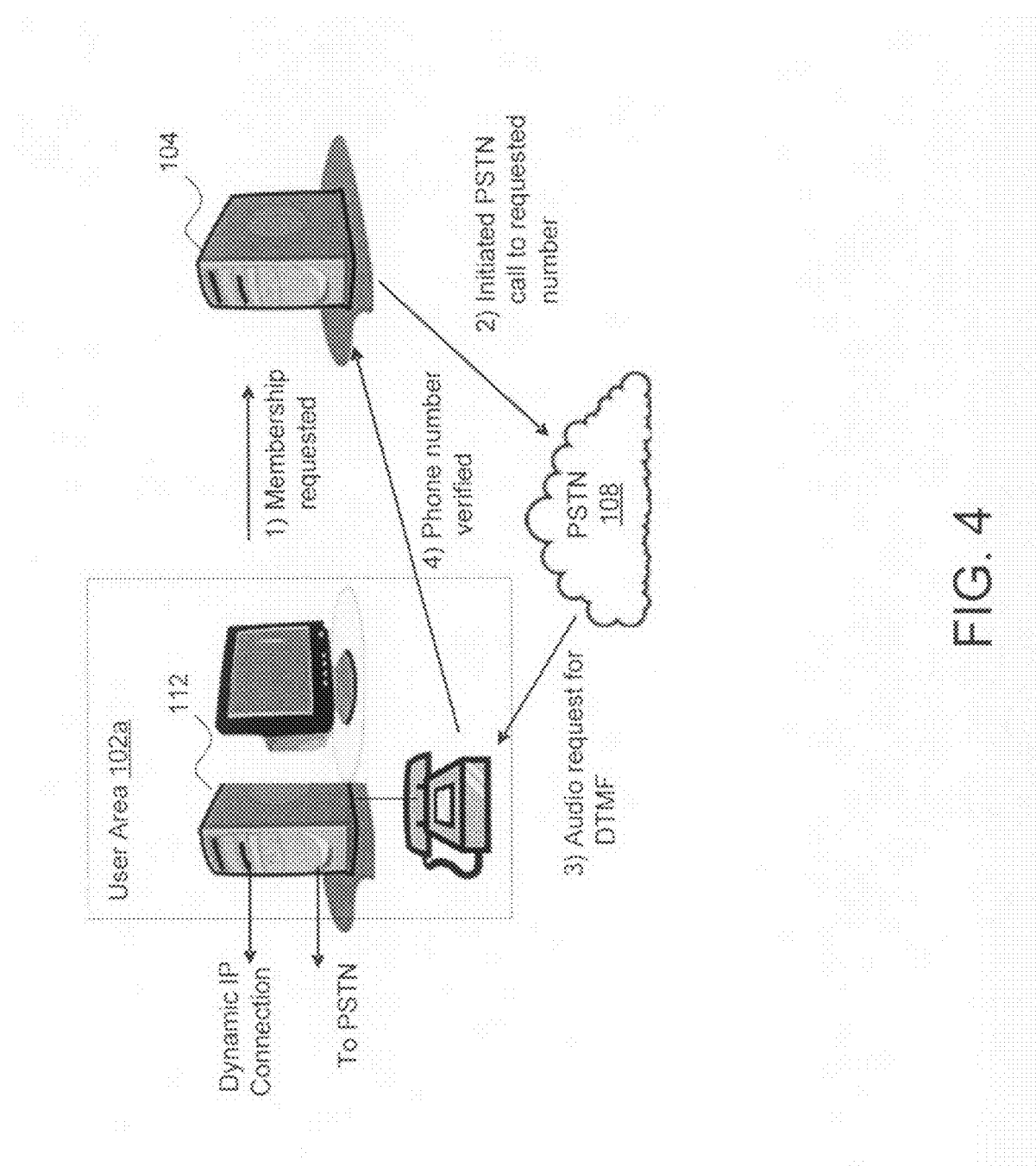
FIG. 4 is a diagram illustrating an exemplary telephone number verification process.

FIG. 4 is a diagram illustrating an exemplary telephone number verification process. When a trixNet user (e.g., subscriber to trixNet services) opts to enroll an existing carrier-issued telephone number, the user may enter the telephone number in a web interface provide by the management interface module 202. In order to avoid abuse, the verification module 208 will initiate the verification process. Initially, a membership request is sent from the call management system 112 to the data center system 104. The membership request may comprise, at least, a telephone number which the user wants to register for trixNet service.

Upon receipt of the membership request, the verification module 208 initiates a PSTN call to the entered carrier-issued telephone number being registered. The PSTN call may request a user at the telephone number to provide a response to the verification module 208. In one embodiment, the response may be a DTMF entry of a validation code given via verbal instructions. Only if the code is entered correctly is the number entered into the relational database and registered for trixNet service. Should the number be re-assigned via the PSTN to another user, the number may be re-validated at any time by request of the owner of the telephone number in accordance with one embodiment.

In some embodiments, trixNet service may be used on an "opt-in" (e.g., users must register phone numbers) or opt-out basis. As such, trixNet may be used in a partial manner on a PBX, whereby some phone numbers (e.g., DIDs) participate in trixNet services and some phone numbers do not.

Figure 5:
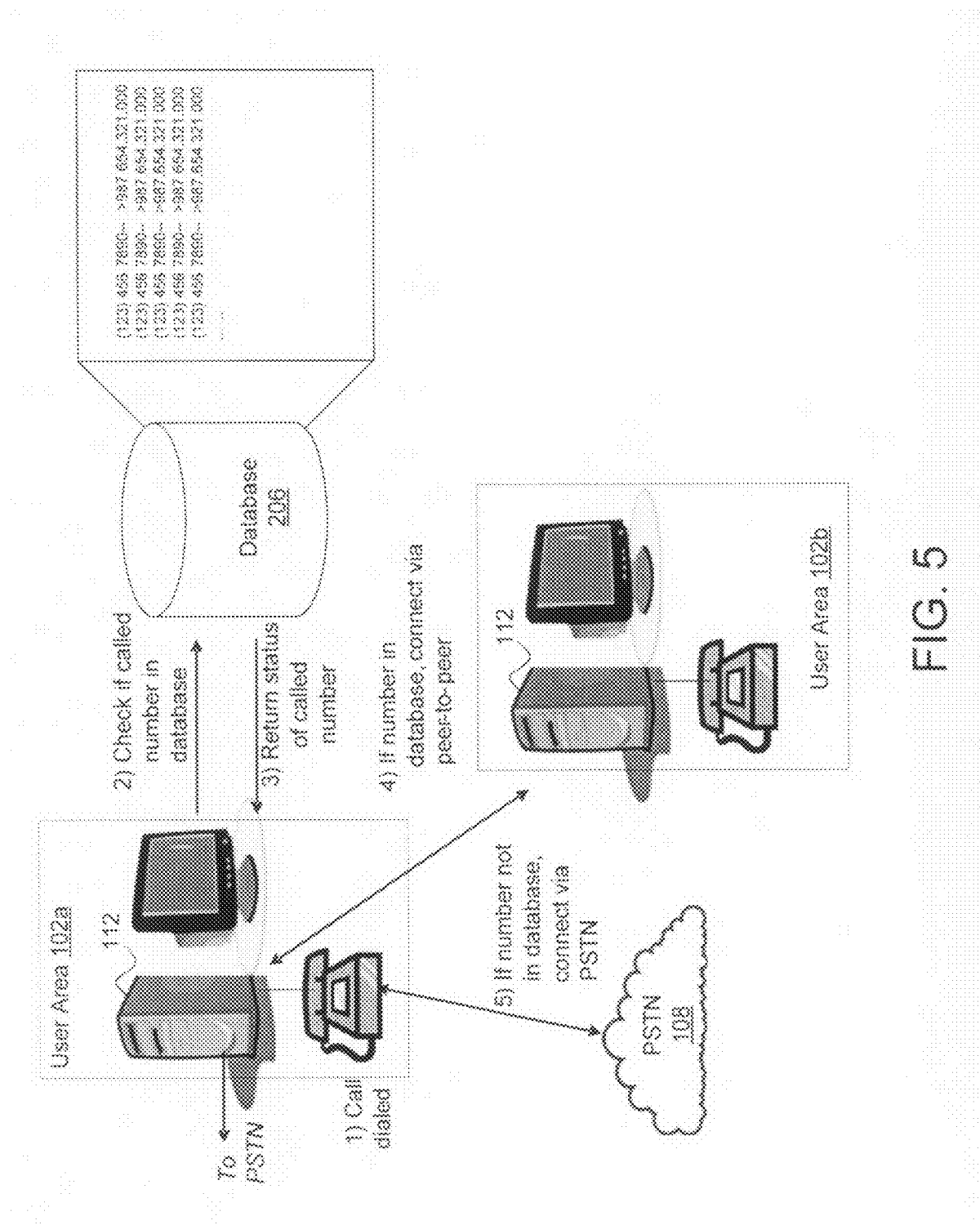
FIG. 5 is a diagram illustrating an exemplary call connection process.

Referring now to FIG. 5, a diagram illustrating an exemplary call connection process is shown. When a carrier-issued telephone number is dialed at the network device 110, a request may be made via a data connection to the relational database 206 using the dialed carrier-issued telephone number as a lookup key. A status of the dialed carrier-issued telephone number is then returned by the routing instruction module 210. If the carrier-issued telephone number is not in the relational database 206, the call is routed via the standard third-party routes chosen by the user (or their administrator). The standard third-party route may comprise, for example, a third-party VoIP service, which may not be free. In other embodiments, the standard third-party route may comprise a communication over the PSTN 108. If the carrier-issued telephone number is in the relational database 206, a peer-to-peer VoIP connection may be initiated, connecting the call via the IP network 106 using the mapped address, which circumvents the PSTN 108 completely.

Figure 6:
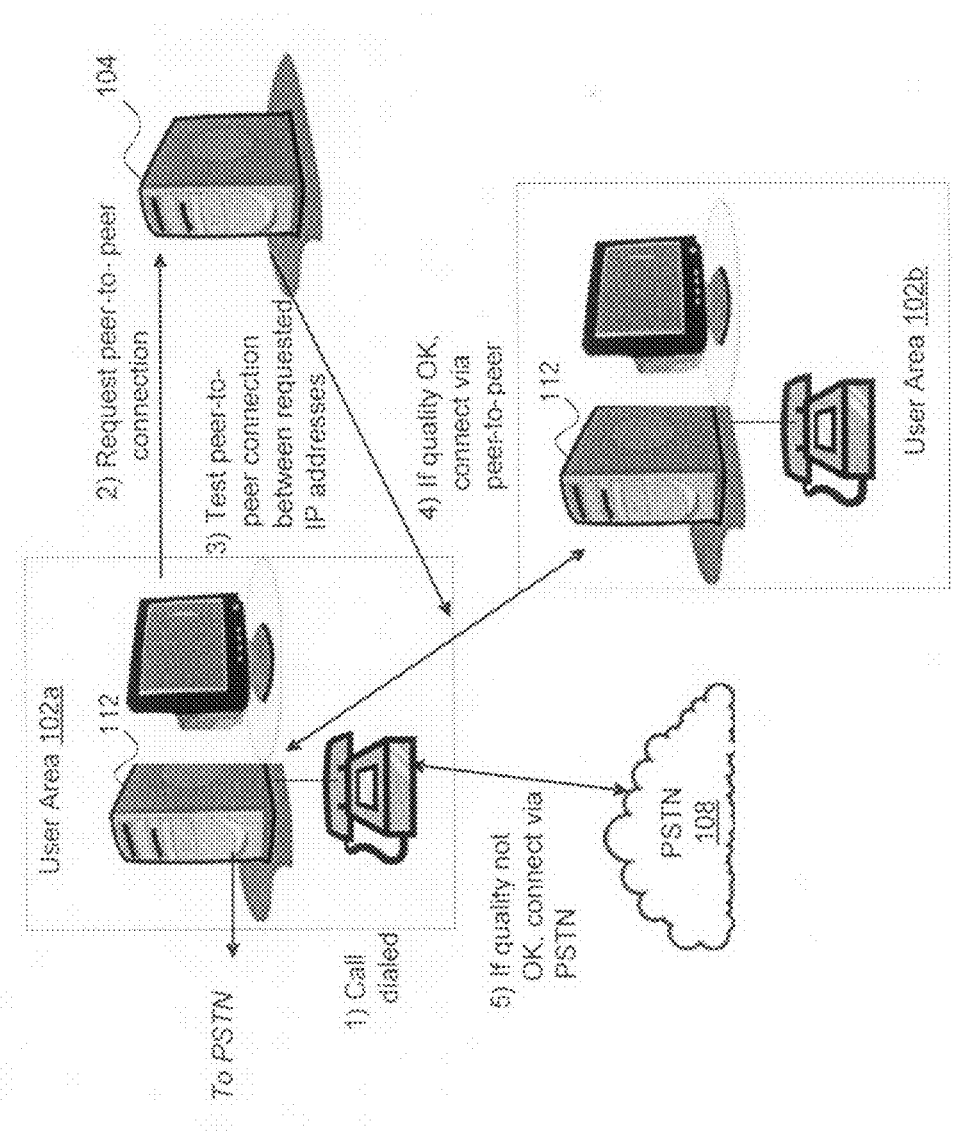
FIG. 6 is a diagram illustrating an exemplary call quality control process.

Referring now to FIG. 6, a diagram illustrating an exemplary call quality control process is shown. When a call is placed from one trixNet user to another, the availability and quality of the connection may be tested or monitored in real-time. Connection quality can be determined by a user-specific set of specifications, including but not limited to jitter, latency, sine-wave audio echo analysis, and live MOS scoring. If quality is determined to be within specification, the call is placed via the peer-to-peer trixNet connection. If the quality is not within specification, the call may automatically fall back to the standard connection chosen by the user (e.g., third-party VoIP or PSTN). In exemplary embodiments, the monitoring and fallback may be performed by the fallback module 316. In some embodiments, the monitoring may be performed, in part, by the system monitoring module 212.

Figure 7:
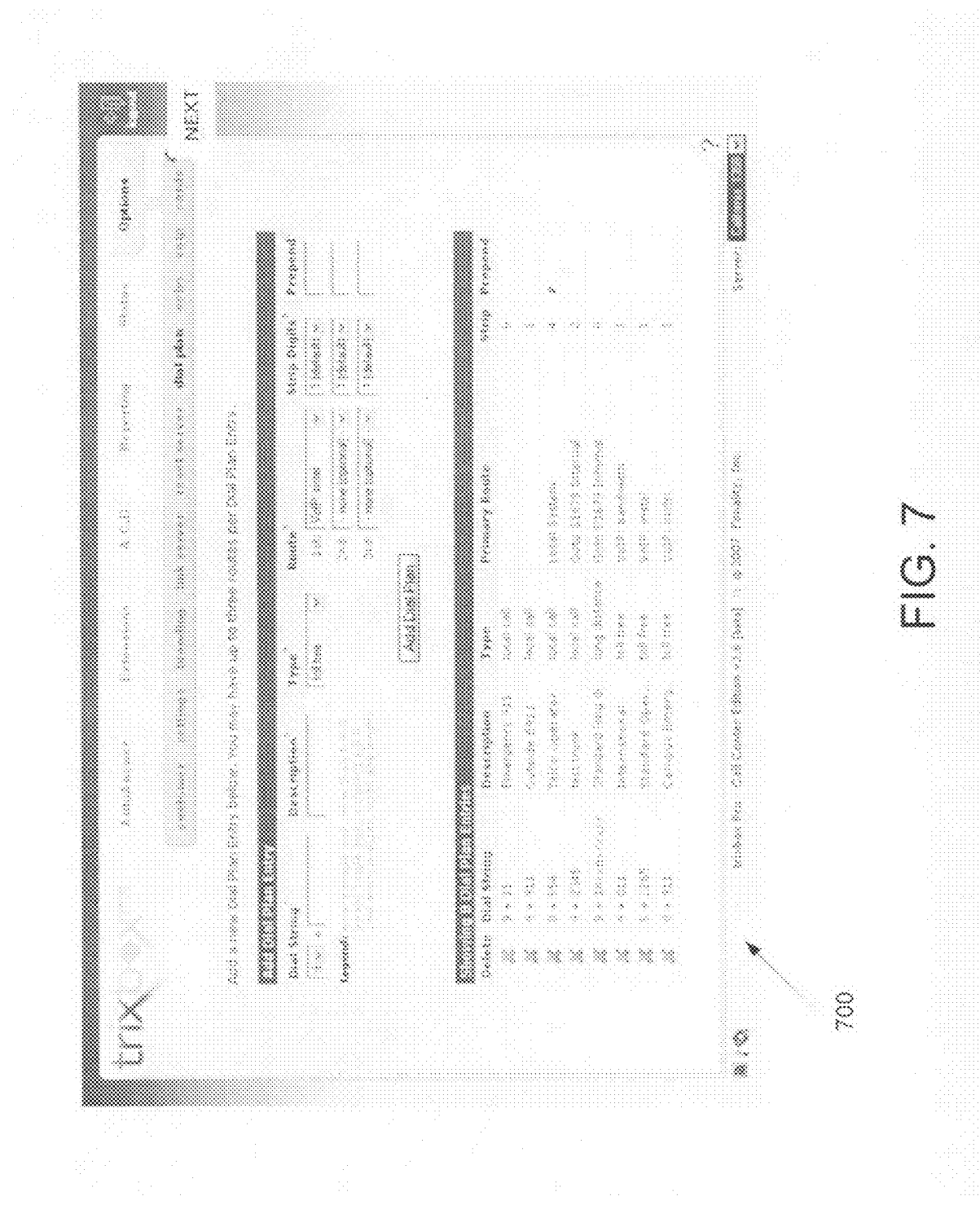
FIG. 7 is an example of a screenshot for establishing dial plans.

In one embodiment, the PBX 302 or call management system 112 administrators may build dial-plans that specifically include or exclude trixNet services. This allows a non-holistic implementation of trixNet services whereby a user can indicate on a per call basis if they want to participate in trixNet service. FIG. 7 illustrates an exemplary dial plan user interface 700 provided by the communication interface module 308 for establishing dial plans. Via the dial plan user interface 700, dial strings, descriptions, type, and primary routes may be provided. For example, a dial plan may be established whereby the user first dials 8 to make a trixNet call or first dials 9 to make a normal call. Another example may comprise providing the users with a software application, such as HUD, whereby the users may indicate automatic or partial inclusion into the trixNet service on a per call or holistic basis. An exemplary discussion of the HUD application is found in U.S. patent application Ser. No. 11/827,314, filed Jul. 11, 2007 and entitled "System and Method for Centralized Presence Management of Local and Remote Users," which is incorporated by reference.

Figure 8:
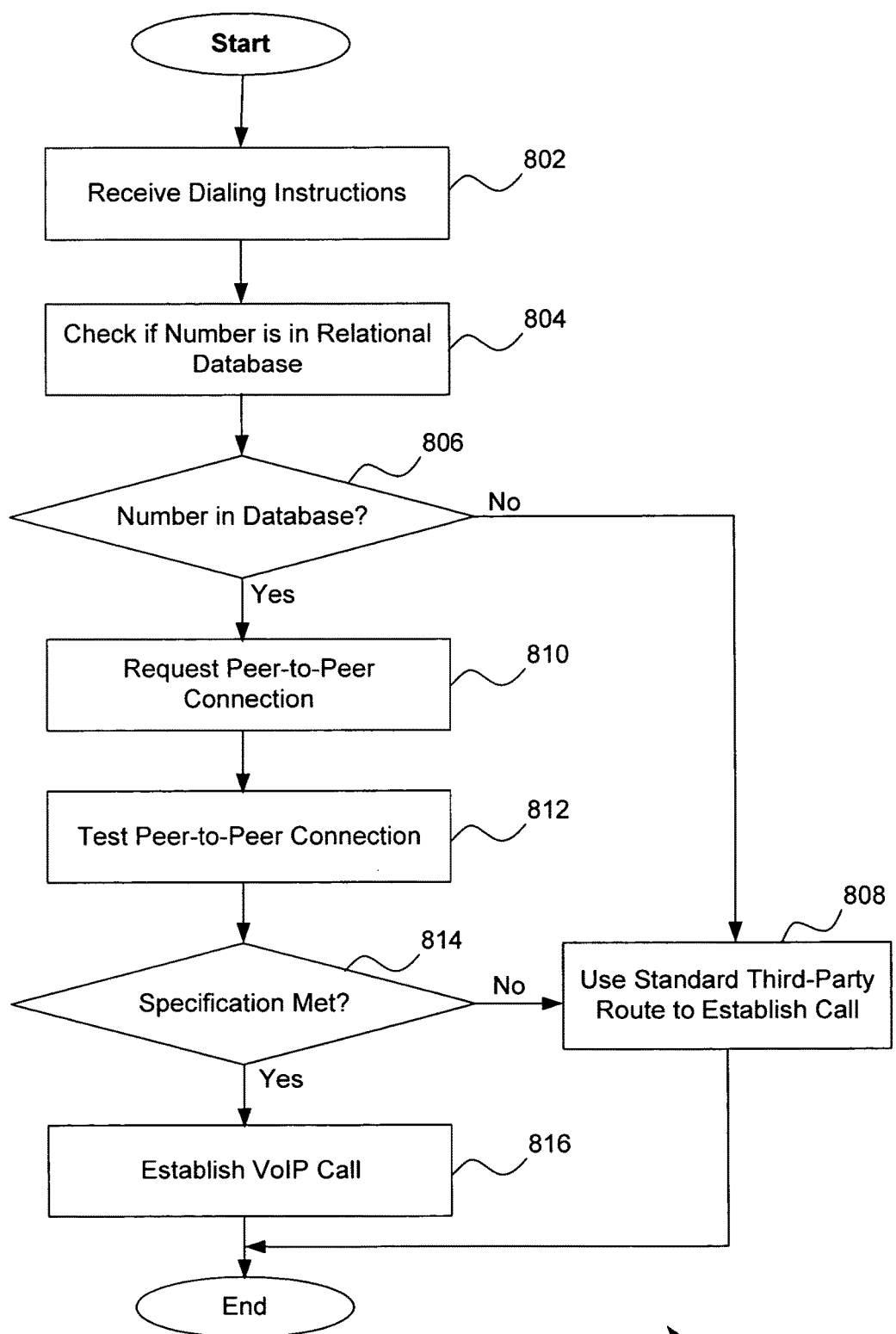
FIG. 8 is a flowchart of an exemplary method for providing carrier-independent VoIP communication.

FIG. 8 is a flowchart 800 of an exemplary method for seamlessly providing carrier-independent VoIP communication using existing standard carrier-issued telephone numbers. In step 802, dialing instructions are received from a registered trixNet user (e.g., via a registered trixNet network device having a registered telephone number). In exemplary embodiments, the dialing instructions comprise a carrier-issued telephone number associated with a call recipient. A request to check the relational database 206 is sent in step 804 to determine if the carrier-issued telephone number is a registered telephone number for trixNet service.

Using the carrier-issued telephone number as a lookup key, a determination is made as to whether the carrier-issued telephone number is registered in the carrier-independent relational database 206 in step 806. If the carrier-issued telephone number is not in the relational database 206, then the call is routed via the standard third-party route chosen by the user (or their administrator) in step 808. The standard third-party route may comprise, for example, a third-party VoIP service, which may not be free. In other embodiments, the standard third-party route may comprise a communication over the PSTN 108.

If the carrier-issued telephone number is in the relational database, this indicates that the carrier-issued telephone number is registered for trixNet service. Since both the caller and call recipient are using trixNet registered network devices (e.g., via their registered carrier-issued telephone numbers), the call may be established for free over a (trixNet) carrier-independent network. As such, a peer-to-peer connection may be requested in step 810. In exemplary embodiments, the mapped address is determined. The address may then be returned to the call management system 112, which requests establishment of the peer-to-peer connection.

The peer-to-peer connection between the two addresses (of the caller and call recipient) may be tested in step 812 in order to ensure availability and quality. In one embodiment, the system monitoring module 212 of the data center system 104 may check the quality and availability of the IP network 106. In other embodiments, the fallback module 316 of the call management system 112 may check the quality or availability of the IP network 106.

If in step 814, the peer-to-peer connection exceeds the acceptable specification established by user (or their administrator), then the VoIP call may be established in step 816. However, if the acceptable specifications are not exceeded, then the call is routed via the standard third-party route chosen by the user (or their administrator) in step 808.

It should be noted that FIG. 8 is exemplary. More, less, or functionally equivalent steps may be embodied in alternative embodiments. Furthermore, the steps may be practiced in a different order. For example, the carrier-independent VoIP call may be initially established. Subsequently, the peer-to-peer connection may be tested (e.g., in real-time) for quality and other requirements established in the user-specified standard to determine if the call should fall back to the standard third-party route.

It should be noted that trixNet can federate with other calling services such as Skype or GoogleTalk and even other calling directories such as eNUM, FWD, or other number resolving schemas. Additionally, trixNet can be extended with APIs so that other calling services or directories can federate with trixNet users.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. For example, each node may comprise some or all of the functions and modules associated with the data center system 104 in decentralized embodiments. The node may be the call management system 112 in one embodiment. Therefore, these and other variations upon the exemplary embodiments are intended to be covered by the present invention.

The invention claimed is:

1. A method for seamlessly providing a carrier-independent peer-to-peer VoIP call, the method comprising:
    receiving an existing carrier-issued telephone number to be called;
    determining whether the existing carrier-issued telephone number corresponds to a registered telephone number stored in a carrier-independent database;
    based on the existing carrier-issued telephone number corresponding to the registered telephone number in the carrier-independent database:
        placing a call via a carrier-independent peer-to-peer connection using a first address associated with the registered telephone number, wherein the first address is a dynamic address;
        determining a second address for the registered telephone number during the call based on the dynamic address changing from the first address to the second address during the call;
        continuing the call, while keeping the call active, using the second address based on the dynamic address changing from the first address to the second address during the call; and
        based on a quality of the carrier-independent peer-to-peer connection not being acceptable during the call based on a user-specific set of specifications, automatically switching the call from the carrier-independent peer-to-peer connection to a standard route, wherein the user-specific set of specifications includes a sine-wave audio echo analysis and a live MOS score; and
    based on the existing carrier-issued telephone number not corresponding to the registered telephone number in the carrier-independent database, placing the call via the standard route.

2. The method of claim 1, further comprising monitoring the carrier-independent peer-to-peer connection to determine if a user specification is acceptable.

3. The method of claim 2 wherein the user specification comprises quality for the carrier-independent peer-to-peer connection.

4. The method of claim 2 wherein the user specification comprises availability of the carrier-independent service.

5. The method of claim 1 wherein the standard route comprises a PSTN connection.

6. The method of claim 1 wherein the standard route comprises a third-party VoIP connection.

7. The method of claim 1 further comprising registering the existing carrier-issued telephone number for carrier-independent VoIP calling service.

8. The method of claim 1 further comprising performing a verification process on the existing carrier-issued telephone number.

9. The method of claim 8 wherein the verification process comprises requesting a DTMF sequence from a device associated with the existing carrier-issued telephone number.

10. The method of claim 8 wherein the verification process comprises a re-verification of the registered telephone number.

11. The method of claim 1 wherein determining if the telephone number comprises a registered telephone number comprises using the existing carrier-issued telephone number as a lookup key in the carrier-independent database.

12. The method of claim 1 wherein the step of automatically falling back to place the call via the standard route occurs during the call.

13. The method of claim 1 further comprising rerouting the call to a current dynamic address for the registered telephone number during the call.

14. The method of claim 1 wherein the step of monitoring occurs in real-time.

15. The method of claim 1, wherein an existing communication identifier of a contactor using a first carrier is resolved to a hostname or address, the contactor contacting a recipient using a second carrier for free over IP.

16. A system for seamlessly providing a carrier-independent peer-to-peer VoIP call, the system comprising:
    a carrier-independent database configured to store registered telephone numbers and corresponding addresses;

a routing instruction module configured to determine if an existing carrier-issued telephone number being called is a registered telephone number stored in the carrier-independent database, and configured to provide a corresponding first address if the existing carrier-issued telephone number is registered in the carrier-independent database, wherein the first address is a dynamic address;

a dynamic address engine configured to determine a second address associated with the registered telephone number and provide the second address to the carrier-independent database during the call when the dynamic address changes from the first address to the second address during the call;

a logic configured to continue the call, while keeping the call active, using the second address when the dynamic address changes from the first address to the second address during the call;

a call routing module configured to establish the call via a peer-to-peer connection over a carrier-independent network if the existing carrier-issued telephone number is registered in the carrier-independent database, and configured to establish the call via a standard route if the existing carrier-issued telephone number is not registered in the carrier-independent database; and a fallback module configured to automatically switch the call from the peer-to-peer connection over the carrier-independent network to the standard connection if the peer-to-peer connection over the carrier-independent network does not meet a quality during the call based on a user-specific set of specifications, wherein the user-specific set of specifications includes a sine-wave audio echo analysis and a live MOS score.

17. The system of claim 16 further comprising a verification module configured to perform a verification process on a telephone number being registered.

18. The system of claim 16, further comprising a system monitoring module configured to monitor the peer-to-peer connection to determine if a user specification is acceptable.

19. The system of claim 18 wherein the system monitoring module is configured to determine quality and availability of the peer-to-peer connection.

20. The system of claim 16 further comprising an update module configured to provide an updated copy of the carrier-independent database to coupled nodes.

21. The system of claim 16, wherein an existing communication identifier of a contactor using a first carrier is resolved to a hostname or address, the contactor contacting a recipient using a second carrier for free over IP.

22. A method for seamlessly providing a carrier-independent peer-to-peer VoIP call, the method comprising:

receiving an existing carrier-issued telephone number to be called;

determining whether the existing carrier-issued telephone number corresponds to a registered telephone number stored in a carrier-independent database;

returning a status based on the existing carrier-issued telephone number corresponding to the registered telephone number stored in the carrier-independent database, the status triggering a call via a peer-to-peer connection using a first address associated with the registered telephone number based on the existing carrier-issued telephone number corresponding to the registered telephone number stored in the carrier-independent database, wherein the first address is a dynamic address;

determining a second address for the registered telephone number during the call based on the dynamic address changing from the first address to the second address during the call;

continuing the call, while keeping the call active, using the second address when the dynamic address changes from the first address to the second address during the call;

based on a quality of the peer-to-peer connection not being acceptable during the call based on a user-specific set of specifications, automatically switching the call from the peer-to-peer connection to a standard route, wherein the user-specific set of specifications includes a sine-wave audio echo analysis and a live MOS score; and triggering a call via the standard route based on the existing carrier-issued telephone number not corresponding to the registered telephone number stored in the carrier-independent database.

23. The method of claim 10, further comprising monitoring the peer-to-peer connection to determine if a user specification is acceptable.

24. The method of claim 10, wherein an existing communication identifier of a contactor using a first carrier is resolved to a hostname or address, the contactor contacting a recipient using a second carrier for free over IP.

* * * * *